May 13, 1969 R. L. DE BIASSE 3,443,461
ANTI-FRICTION DEVICE FOR HEAVY MACHINE PARTS
Filed Nov. 10, 1966 Sheet 1 of 2

INVENTOR
RICHARD L. DEBIASSE
BY
HIS ATTORNEYS

May 13, 1969     R. L. DE BIASSE     3,443,461

ANTI-FRICTION DEVICE FOR HEAVY MACHINE PARTS

Filed Nov. 10, 1966     Sheet 2 of 2

INVENTOR
RICHARD L. DEBIASSE
BY

HIS ATTORNEYS

United States Patent Office 3,443,461
Patented May 13, 1969

3,443,461
ANTI-FRICTION DEVICE FOR HEAVY MACHINE
PARTS
Richard L. De Biasse, 3 Oak St., Madison, N.J. 07940
Filed Nov. 10, 1966, Ser. No. 593,554
Int. Cl. B23b 23/00
U.S. Cl. 82—32   7 Claims

ABSTRACT OF THE DISCLOSURE

Movement of a lathe tailstock along its ways implemented by use of polytetrafluoroethylene pistons slidably received in bores in tailstock carriage and having downwardly and outwardly projecting front ends engaging such ways. Such pistons are backed by O rings which yield to permit the undersurfaces of the carriage to be clamped to the ways.

---

This invention relates to improvements in machine tools and other apparatus having heavy members movable along guideways or ways, and more particularly to means for facilitating movement of such heavy members along the ways and reducing wear thereon.

In heavy machines, such as, for example, heavy duty metal-working lathes, the tailstock of the lathe is mounted on ways on the lathe bed or frame and is slidable toward and away from the headstock of the lathe to accommodate workpieces of different lengths, and to enable insertion and removal of the workpieces. In many such lathes, the tailstock weighs several hundred pounds and to move it along the ways, even in the presence of oil or other lubricant, a hand crank and rack and pinion drive, an air motor or the like to required because of the friction between the ways and the opposing guide surfaces on the tailstock.

The friction between the ways and the guide surfaces on the tailstock results in wear on the ways and guide surfaces especially when frequent adjustments of the tailstock are necessary so that after relatively short periods of operation, the center of the tailstock becomes misaligned with the headstock center. Costly repairs are then required to realign the centers of the headstock and tailstock.

Some lathes and other heavy equipment on machines have been equipped with hardened steel or chromium-plated wearing surfaces to reduce wear thereon, but at greatly increased cost without, however, overcoming the problem of reducing the power required to move the heavy tailstock or other heavy member along the ways.

The above-mentioned difficulties are multiplied in the case of automatic or programmed machines which by their relatively high speed operation greatly increase the wear and tear on the machine.

In accordance with the present invention, a simple and inexpensive means is provided for reducing the friction between a heavy machine part and the guides or ways of the machine frame or bed so that the heavy machine part will slide easily along the ways and will not produce appreciable wear even over prolonged periods of operation and adjustment.

More particularly, the heavy adjustable machine part is provided with pieces or blocks of a low-friction material for engaging the ways or guides of the machine or surfaces adjacent thereto and are projected from the machine part to displace it a few thousandths of an inch away from the ways and thereby reduce the pressure and friction between them in response to the release of the machine part by its clamping mechanism.

Inasmuch as the pieces or blocks have a much lower coefficient of friction than the machine parts and ways which usually are formed of cast iron or steel, resistance to movement of the machine part, especially in the presence of oil or other lubricant, is reduced to a small fraction of the normal resistance. When the pieces or blocks are formed of a low-friction plastic such as "Teflon" (tetrafluoropolyethylene), a lathe tailstock formerly requiring a crank and rack and pinion or an air cylinder to move it, can be pushed manually with only light effort and with a minimum of wear on the ways on the lathe bed and guide surfaces of the tailstock. Inasmuch as the guide surfaces and the ways of the tailstock and bed, respectively, must be forced together by means of the tailstock clamps, the pieces or blocks of low friction material are mounted for retraction so that they will not interfere with the clamping action. To that end, the blocks may be normally biased in a direction to project them by means of resilient elements which are capable of exerting the necessary force to relieve the pressure between the guide surfaces and the ways of the machines or apparatus. While metallic springs and the like can be used as biasing means, a most suitable biasing means may consist of an O-ring formed of an oil-resistant elastomer, such as, for example, a synthetic rubber O-ring formed of "Neoprene" or the like. The O-ring is of such dimensions, depending upon the load to be displaced, that it can be compressed by the clamping means but will expand upon release of the clamping means to displace or lift the heavy machine part sufficiently to reduce the friction between the ways and the guide surfaces to enable ready sliding movement of the machine part along the ways. Generally, the resilient means need only displace or lift the heavy machine part a few thousandths of an inch to enable free sliding of the machine part on the ways.

For a better understanding of the present invention, reference may be had to the accompanying drawings, in which FIGURE 1 is a side elevational and schematic illustration of a lathe in which the present invention is utilized;

Figure 1:
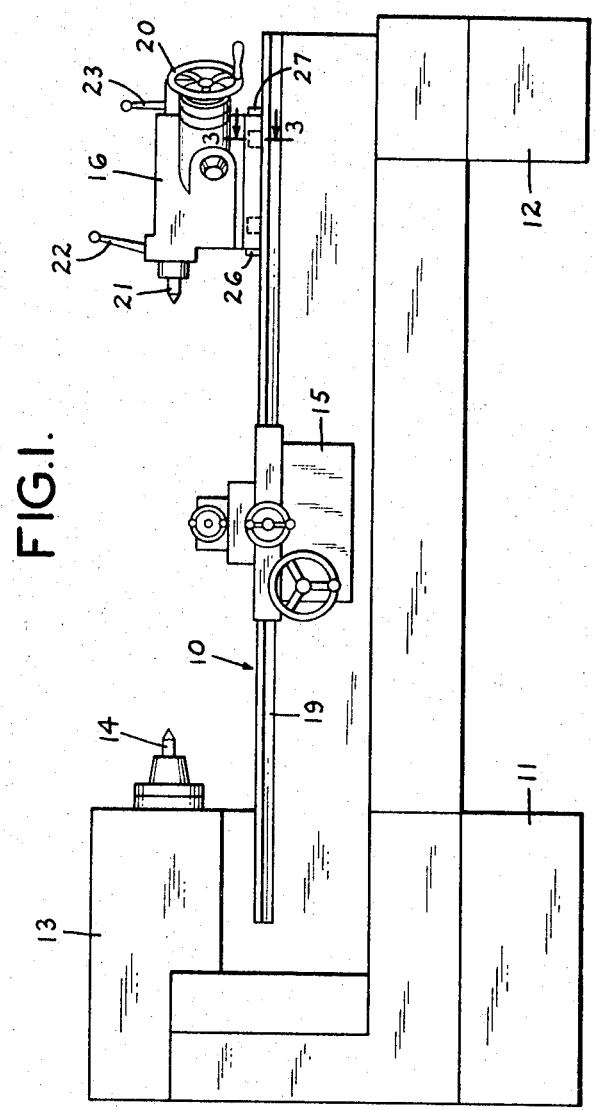

For purposes of illustration, FIGURE 1 discloses schematically a typical lathe although the invention is not limited to lathes. As shown in FIGURE 1, the lathe includes the usual bed 10 having standards or legs 11 and 12 at opposite ends thereof, a headstock 13 with a headstock spindle 14, a carriage 15 which may be driven by means of a suitable leadscrew (not shown), and a tailstock 16. The headstock may be provided with the usual gearing and a face plate chuck or the like may be used in place of the spindle 14.

Figure 2:
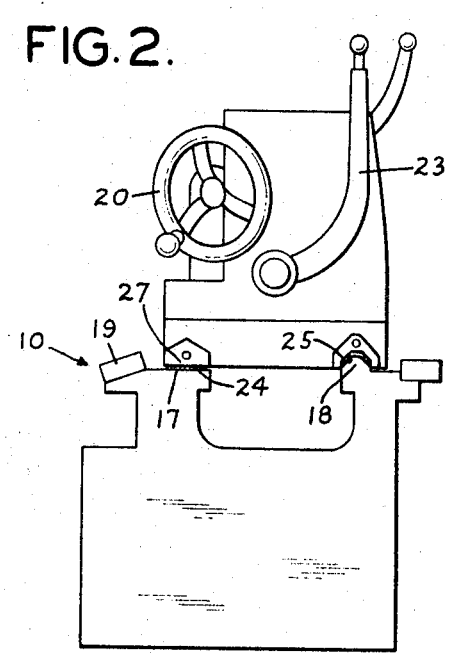
FIGURE 2 is an end elevational view of the lathe.

Extending lengthwise of the bed 10 and as shown in FIGURE 2, are ways 17 and 18 of flat and inverted V-shape configuration, respectively, on which the tailstock 16 is mounted for sliding movement lengthwise of the bed toward and away from the headstock 13. The bed may be provided with additional ways, for example, a way 19, which serves to support one side of the carriage 15. The tailstock is provided with the usual hand wheel or crank 20 by means of which the spindle 21 can be extended and retracted and a handle 22 is provided for locking the spindle 21 in adjusted position. In addition, the tailstock may be provided with a handle 23 by means of which the tailstock may be locked to or clamped to the bed 10 of the lathe and released therefrom for adjustment. The structure and arrangement of the elements 20, 21, 22 and 23 are susceptible to wide variation and many different arrangements thereof are known in the art and need not be described herein inasmuch as they are conventional.

On the underside of the tailstock 16 are guide surfaces 24 and 25 which are generally complemental to the ways 17 and 18 and are slidable thereon. To facilitate sliding, oil is usually applied to the ways. Also, as is conventional, the tailstock is provided with wipers 26 and 27 at its opposite ends for removing chips and cuttings from the ways to avoid damage thereto. As is well-known in the art, these wipers may be small pieces of felt clamped in a position to engage the surfaces of the ways 17 and 18.

As indicated above, when the tailstock is heavy to assure rigidity, as is usually the case in a metal-working lathe, the tailstock is not readily moved along the ways when the clamping lever 23 is released; firstly, because oil or other lubricant has been squeezed out from between the ways 17 and 18 and the engaging surfaces 24 and 25, and secondly, because the guide surfaces and ways are formed of iron or steel and accordingly have a relatively high coefficient of friction with respect to each other. It is for this reason that manually-actuated multiple gearing or power shifting means have been provided heretofore to move the tailstock.

Figure 3:
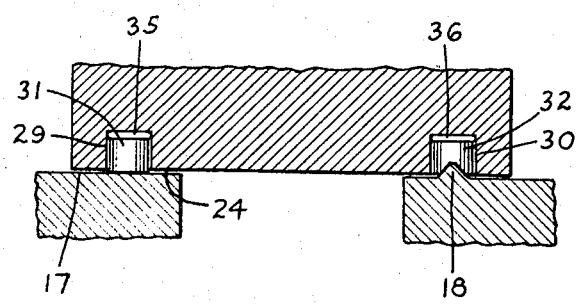
FIGURE 3 is a view in section taken in line 3—3 of FIGURE 1.
Figure 4:
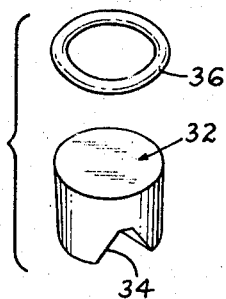
FIGURE 4 is an exploded perspective view of one of the block and O-ring assemblies in accordance with the present invention.

In accordance with the present invention, the tailstock 16 is provided adjacent its right-hand and left-hand ends as viewed in FIGURE 1 with pairs of bores or recesses 29 and 30 in the guide surfaces 24 and 25 overlying the ways 17 and 18. Mounted within the recesses 29 and 30 are blocks or pieces 31 and 32 of material having a low coefficient of friction (low-friction material) such as, for example, "Teflon". As shown in FIGURE 3, the block 31 is of cylindrical shape and has a flat lower end 33 for engagement with the flat surface of the way 17. As shown in FIGURES 3 and 4, the block 32 of low-friction material also is cylindrical and is provided with a V-shaped transverse notch 34 complemental to the shape of the inverted V-shaped way 18. In the base of each recess 29 and 30, and in engagement with the top of each block 31 and 32, are O-rings 35 and 36 formed of "Neoprene" or other oil-resistant elastomer. The size of the O-ring, the height of the block, and the depth of the recesses are related so that when clamping pressure of the tailstock is released by means of the lever 23, the resiliency of the O-ring will displace or lift the tailstock a few thousandths of an inch to reduce the cohesion between the guide surfaces and the ways and to support the weight of the tailstock at least in part on the pairs of blocks 31 and 32 at the front and rear of the tailstock. Due to the low-friction characteristics of these blocks, the tailstock can be moved with relatively little effort along the ways even though the tailstock may weigh a hundred or more pounds, as is usually the case.

By way of example, in a lathe having an eight-inch swing, the blocks 31 and 32 may be 1¼ inches in diameter and ½ inch high, and the resilient O-rings are also 1¼ inches in diameter and have a cross-sectional diameter of 3/16 of an inch. The depth of the recesses (maximum) is 5/8 of an inch. The resiliency or biasing action of the O-rings 35 and 36 is sufficient to raise the tailstock about seven thousandths to ten thousandths of an inch which is insufficient to disengage the wipers 26 and 27 from the ways but entirely adequate to reduce the frictional forces resisting movement of the tailstock to the extent that if the tailstock is given a moderate push it will slide freely a substantial distance along the ways before coming to a stop.

Inasmuch as the low-friction blocks carry a substantial part of the load of the tailstock or other heavy machine part, and are softer than the metal of the ways, little or no wear occurs on either the ways or on the guide surfaces of the headstock. On the other hand, the softer low-friction material, such as "Teflon," tends to wear off and to a degree embed itself in the surfaces of the ways so that they, in effect, become plated with an extremely thin film of low-friction material which further assists in the sliding movement of the tailstock. The wearing away of the blocks, of course, necessitates their replacement after a prolonged period of operation but this can be readily accomplished at relatively low cost by merely backing off the tailstock and replacing the worn blocks with new ones. Machining or refinishing of the ways and the guide surfaces, which are expensive and time-consuming operations, are avoided.

It will be understood that with heavier tailstocks, more than four of the low-friction blocks may be mounted in the tailstock and that the size of the O-rings may be modified to enable them to project the blocks sufficiently to cause relatively free sliding movement of the tailstock along the ways. Moreover, as indicated above, the low-friction blocks may be mounted to engage surfaces other than the ways themselves so long as these other surfaces are smooth and straight. Moreover, other means may be provided for projecting and retracting the low-friction blocks responsive to operation of the clamping lever 23. Accordingly, the form of the invention, described herein, should be considered as illustrative and not as limiting the scope of the following claims.

I claim:

1. In apparatus comprised of a metal bed with smooth surfaces extending therealong, a metal carriage guidedly movable along said bed over said surfaces and having surfaces registering with ones of said bed surfaces, and means to clamp together and unclamp said registering surfaces for the purposes of, respectively, locking said carriage and releasing said carriage in relation to said bed, the improvement comprising, a plurality of piston-receiving chambers characterizing said carriage and having lower open ends over ones of said bed surfaces, a plurality of pistons each slidably received in a respective one of said chambers and comprised of a block of synthetic resinous plastic material characterized by a lower coefficient of friction than that of the metal of said bed and carriage, each of said pistons having at its forward end a bearing face provided by said material and both mating in conformation with and engageable with the underlying bed surface to provide for area contact between such face and surface, and piston displacing means operable in the absence of a clamping action by said clamp means to urge said piston faces outward of said chambers so as to support the carriage weight through said pistons and on the underlying bed surfaces by slidable area contacts made between said piston faces and such surfaces, said displacing means concurrently serving to raise said carriage surfaces off the registering bed surfaces, and said displacing means being operable in the presence of a clamping action by said clamp means to permit a clamping together of such registering bed surfaces and carriage surfaces.

2. The apparatus set forth in claim 1 in which said piston material is a tetrafluoroethylene polymer.

3. The improvement as in claim 1 in which said bed forms ways providing the surfaces which register with said carriage surfaces and to which said carriage surfaces are adapted to be clamped, said chambers are in the form of bores formed in said carriage and registering with said way surfaces and extending into said carriage from said carriage surfaces so as to have lower end openings surrounded by such surfaces, said piston faces are engageable with said way surfaces to support the carriage weight through said pistons on said ways by slidable area contacts made between said piston faces and said way surfaces, and said displacing means is operable in response to a clamping action by said clamp means to permit retraction of said pistons in said bores in an amount rendering said piston faces flush with the carriage surfaces surrounding said bores to thereby permit such surfaces to be clamped to said way surfaces.

4. The improvement as in claim 1 in which said chambers have backs at the upper ends thereof, and in which said piston displacing means comprises an O-ring disposed in each chamber between the back thereof and the piston therein and compressible by carriage weight received from said back to resiliently transmit such weight to the associated piston.

5. The improvement as in claim 4 in which each of said O-rings is formed of an oil-resistant elastomeric material.

6. The improvement as in claim 4 in which each of said compress O-rings is unconstrained by stop means limiting the resilient expansion of each ring when the weight force thereon is removed.

7. In apparatus comprised of metal ways, a metal carriage movable over and along said ways and having surfaces registering with said ways, and means to clamp said surfaces to said ways and to unclamp said surfaces therefrom for the purposes of, respectively, locking said carriage and releasing said carriage in relation to said ways, the improvement comprising, a plurality of tubular bores formed in said carriage to extend upwardly from said surfaces part way through said carriage and to have lower end openings surrounded by said surfaces and registering with said ways, a plurality of pistons each slidably received in a respective one of said bores and each comprised of a block of tetrafluoroethylene polymer, each of said pistons having at its forward end a bearing face provided by said polymer and both mating in conformation with and engageable with the surface of the underlying way to provide for area contact between such face and such surface, and a plurality of O-rings each disposed in a respective one of said bores between the back thereof and the piston therein, said rings being compressible by carriage weight received from the backs of the corresponding bores to resiliently urge said pistons forward and the faces thereof outward of said bores so as, in the absence of a clamping action by said clamp means, to support the whole weight of said carriage through said pistons and on said ways by slidable area contacts made between said piston faces and said way surfaces, said urging of said pistons by said rings concurrently serving to raise said carriage surfaces off said ways, and said rings in the presence of a clamping action by said clamp means being further compressible to permit retraction of said piston into said bores in an amount rendering said piston faces flush with the carriage surfaces surrounding said bore openings so as to thereby permit clamping of such surfaces to said ways.

References Cited
UNITED STATES PATENTS

| | | | |
|---|---|---|---|
| 2,540,586 | 2/1951 | Lauterbur et al. | 82—31 |
| 2,832,651 | 4/1958 | Berthiez | 308—3 |
| 3,054,645 | 9/1962 | Evans | 308—3 |

LEONIDAS VLACHOS, *Primary Examiner.*

U.S. Cl. X.R.

82—31; 308—8